US010152775B1

United States Patent
Bellows et al.

(10) Patent No.: US 10,152,775 B1
(45) Date of Patent: Dec. 11, 2018

(54) LOW LATENCY MIXED REALITY HEAD WEARABLE DEVICE

(71) Applicant: Rockwell Collins, Inc., Cedar Rapids, IA (US)

(72) Inventors: Peter R. Bellows, Marion, IA (US); Danilo P. Groppa, Orlando, FL (US); Brad A. Walker, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/672,052

(22) Filed: Aug. 8, 2017

(51) Int. Cl.
*G06F 3/01* (2006.01)
*G06T 1/20* (2006.01)
*G06T 5/00* (2006.01)
*G06T 19/00* (2011.01)
*G02B 27/01* (2006.01)

(52) U.S. Cl.
CPC .......... *G06T 5/003* (2013.01); *G02B 27/0172* (2013.01); *G06F 3/011* (2013.01); *G06T 1/20* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 5,844,530 A * | 12/1998 | Tosaki | ............... | G02B 27/017 345/8 |
| 6,411,302 B1 * | 6/2002 | Chiraz | ............... | G06F 3/1431 345/531 |
| 2007/0103564 A1 * | 5/2007 | Chiba | ............... | H04N 5/2351 348/223.1 |
| 2010/0019129 A1 * | 1/2010 | Ishigaki | ............... | H01L 27/14621 250/208.1 |
| 2015/0163414 A1 * | 6/2015 | Nikkanen | ............... | H04N 5/353 348/229.1 |
| 2015/0260474 A1 * | 9/2015 | Rublowsky | ............... | F41A 33/00 434/16 |
| 2015/0379697 A1 * | 12/2015 | Pohl | ............... | G06T 5/006 345/589 |

(Continued)

OTHER PUBLICATIONS

Wikipedia, Virtual reality headset, https://en.wikipedia.org/wiki/Virtual_reality_headset, 6 pages, Printed online Jun. 28, 2017.

*Primary Examiner* — Jason A Pringle-Parker
(74) *Attorney, Agent, or Firm* — Angel N. Gerdzhikov; Donna P. Suchy; Daniel M. Barbieri

(57) ABSTRACT

A head wearable device, a method, and a system. The head wearable device may include a display, a camera, a buffer, and a processor. The buffer may be configured to buffer a portion of real scene image data corresponding to a real scene image from the camera. The processor may be configured to: perform a combined distortion correction operation; perform a foreground separation operation; perform a smoothing operation on blending values; perform a chromatic aberration distortion correction operation; receive virtual scene image data corresponding to a virtual scene image; blend processed real scene image data with the virtual scene image data to create a mixed reality scene image as mixed reality scene image data; and output the mixed reality scene image data to the display for presentation to a user.

19 Claims, 13 Drawing Sheets

(56) References Cited

U.S. PATENT DOCUMENTS

2016/0148429 A1* 5/2016 Groppa ................ G06T 19/006
                                                    345/419
2017/0237964 A1* 8/2017 Maenpaa ........... H04N 13/0014
                                                    348/39

* cited by examiner

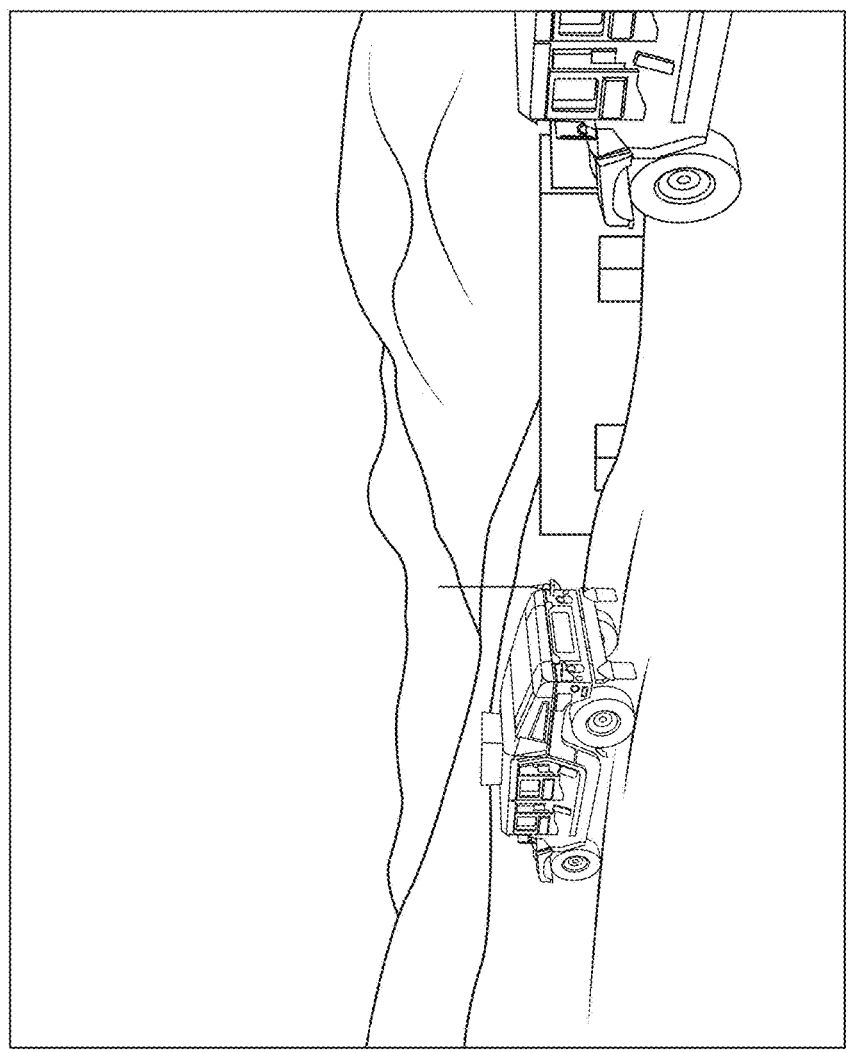

LOW LATENCY MIXED REALITY HEAD WEARABLE DEVICE

CROSS-REFERENCE TO RELATED APPLICATIONS

The present application is related to U.S. patent application Ser. No. 15/661,964, filed on Jul. 27, 2017, and to U.S. patent application Ser. No. 14/474,778, filed on Sep. 2, 2014, which are hereby expressly incorporated herein in their entirety.

BACKGROUND

Virtual reality (VR) allows simulation and training providers to deliver rich and immersive virtual content. Mixed reality blends virtual scenes and real scenes into a single three-dimensional immersive scene. Mixed reality generally utilizes a method of real-time video processing, extracting foreground imagery from background, and generating a blended scene to a user display, which combines desired real-world foreground objects with a virtual background. Mixed reality user training enhances VR by engaging user muscle memory and providing tactile feedback, which are critical components of learning. Mixed reality allows a trainee to handle real equipment, which the trainee would use in the field, and allows for multi-user training scenarios where teammates can see each other in the same three-dimensional virtual environment.

Low-latency video processing is important to a mixed reality system and is especially important to mixed reality systems that utilize occluded displays, such as the Oculus Rift or the Rockwell Collins Coalescence training system, where the user has an opaque display that does not normally allow the user to view the real world. Currently implemented occluded displays for mixed reality typically require separate cameras to provide the real scene image portion of mixed reality images. The real scene images are captured by the cameras, transformed algorithmically, and transferred to the display before the user will see any of it. Humans can detect any significant latency caused by a video processing path, especially with the wide field of view of a head-worn display because a human's peripheral vision is very sensitive to motion. For example, when a user shakes his or her hand in front of his or her eyes, the user's proprioceptive sense tells the user exactly when and where the hand should appear in the user's field of view. If camera and/or display latency is noticeable, the brain detects the lag, which negatively affects hand-eye coordination and can cause disorientation or even nausea. Experimentation has shown that display latencies of more than approximately 20 milliseconds (ms), "photon-to-pixel", are perceptible and distracting to the user. Latencies of more than 20 ms negate the immersive benefits of mixed reality training. Currently, much of the latency budget of 20 ms is consumed by the camera exposure time, which is typically in a range of 4-15 ms, and frame input/output (I/O) time, which involves transporting the captured frame from the camera to the display. This leaves only a few milliseconds of the 20 ms latency budget to perform any video processing. Typically, video processing requirements are significant because the video processing involves rendering live real scene video that blends cohesively with the virtual scene video. Additionally, such video processing is typically performed on very high-bandwidth video to get a sufficiently high resolution for creating an immersive mixed reality experience.

SUMMARY

In one aspect, embodiments of the inventive concepts disclosed herein are directed to a head wearable device. The head wearable device may include a display, a camera, a buffer, and a processor. The camera may be configured to capture a real scene image. The buffer may be communicatively coupled to the camera and configured to buffer a portion of real scene image data corresponding to the real scene image from the camera. The processor may be communicatively coupled to the buffer. The processor may be configured to: perform a combined distortion correction operation on the real scene image to correct for distortion caused by a lens of the camera while correcting for distortion caused by the display, wherein performance of the combined distortion correction operation results in distortion corrected real scene image data; perform a foreground separation operation on the distortion corrected real scene image data to generate a blending value for each pixel of the distortion corrected real scene image data; perform a smoothing operation on the blending values, wherein performance of the smoothing operation results in smoothed blending values; perform a chromatic aberration distortion correction operation on each of a red channel, a green channel, and a blue channel of the distortion corrected real scene image data and on the smoothed blending values associated with each of the red channel, the green channel, and the blue channel, wherein performance of the chromatic aberration distortion correction operation results in red channel processed real scene image data, green channel processed real scene image data, blue channel processed real scene image data, and processed blending values associated with each of the red channel processed real scene image data, the green channel processed real scene image data, and the blue channel processed real scene image data; receive virtual scene image data corresponding to a virtual scene image; based at least on the processed blending values, blend the red channel processed real scene image data, the green channel processed real scene image data, and the blue channel processed real scene image data with the virtual scene image data to create a mixed reality scene image as mixed reality scene image data; and output the mixed reality scene image data to the display for presentation to a user.

In a further aspect, embodiments of the inventive concepts disclosed herein are directed to a method. The method may include buffering, by a buffer, a portion of real scene image data corresponding to a real scene image from a camera. The method may further include performing, by a processor, a combined distortion correction operation on the real scene image to correct for distortion caused by a lens of the camera while correcting for distortion caused by a display, wherein performance of the combined distortion correction operation results in distortion corrected real scene image data. The method may further include performing, by the processor, a foreground separation operation on the distortion corrected real scene image data to generate a blending value for each pixel of the distortion corrected real scene image data. The method may further include performing, by the processor, a smoothing operation on the blending values, wherein performance of the smoothing operation results in smoothed blending values. The method may further include performing, by the processor, a chromatic aberration distortion correction operation on each of a red channel, a green channel, and a blue channel of the distortion corrected real scene image data and on the smoothed blending values associated with each of the red channel, the green channel, and the blue channel, wherein performance of the chromatic aberration distortion correction operation results in red channel processed real scene image data, green channel processed real scene image data, blue channel processed real scene image data, and processed blending values associated with each of the red channel processed real scene image data, the green channel processed real scene image data, and the blue channel processed real scene image data. The method may further include receiving, by the processor, virtual scene image data corresponding to a virtual scene image. The method may further include, based on the processed blending values, blending, by the processor, the red channel processed real scene image data, the green channel processed real scene image data, and the blue channel processed real scene image data with the virtual scene image data to create a mixed reality scene image as mixed reality scene image data. The method may further include outputting, by the processor, the mixed reality scene image data to the display for presentation to a user.

In a further aspect, embodiments of the inventive concepts disclosed herein are directed to a system. The system may include a display, a camera, a buffer, and a processor. The camera may be configured to capture a real scene image. The buffer may be communicatively coupled to the camera and configured to buffer a portion of real scene image data corresponding to the real scene image from the camera. The processor may be communicatively coupled to the buffer. The processor may be configured to: perform a combined distortion correction operation on the real scene image to correct for distortion caused by a lens of the camera while correcting for distortion caused by the display, wherein performance of the combined distortion correction operation results in distortion corrected real scene image data; perform a foreground separation operation on the distortion corrected real scene image data to generate a blending value for each pixel of the distortion corrected real scene image data; perform a smoothing operation on the blending values, wherein performance of the smoothing operation results in smoothed blending values; perform a chromatic aberration distortion correction operation on each of a red channel, a green channel, and a blue channel of the distortion corrected real scene image data and on the smoothed blending values associated with each of the red channel, the green channel, and the blue channel, wherein performance of the chromatic aberration distortion correction operation results in red channel processed real scene image data, green channel processed real scene image data, blue channel processed real scene image data, and processed blending values associated with each of the red channel processed real scene image data, the green channel processed real scene image data, and the blue channel processed real scene image data; receive virtual scene image data corresponding to a virtual scene image; based at least on the processed blending values, blend the red channel processed real scene image data, the green channel processed real scene image data, and the blue channel processed real scene image data with the virtual scene image data to create a mixed reality scene image as mixed reality scene image data; and output the mixed reality scene image data to the display for presentation to a user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6A shows an exemplary left virtual scene image according to the inventive concepts disclosed herein.

DETAILED DESCRIPTION

Figure 1:
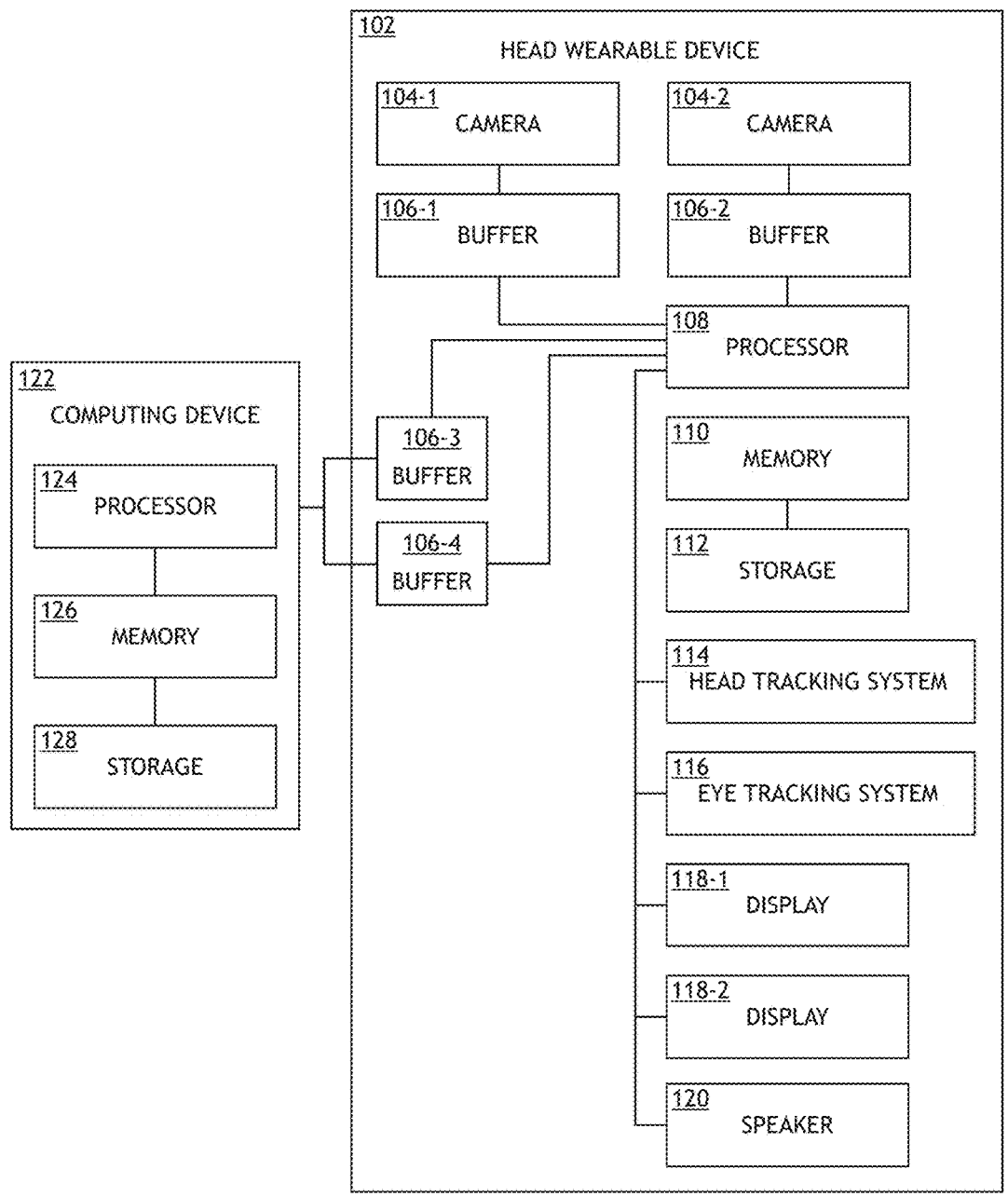
FIG. 1 is a view of an exemplary embodiment of a system including a head wearable device and a computing device according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and at least one device configured to significantly reduce the latency of video processing (e.g., mixed reality video processing). As such, embodiments improve the functioning of a computing device, itself, (e.g., a processor or a head wearable device including a processor) by reducing the latency of mixed reality processing as compared to typical latencies of currently implemented mixed reality video processing. For example, some embodiments reduce mixed reality video processing latency to less than 1 ms. In some embodiments, mixed reality video processing may include steps of video direct memory access (DMA), Bayer filtering, lens and display distortion correction, foreground separation (e.g., chroma keying), and chromatic aberration correction. In some embodiments, a streaming architecture, partial frame-buffering, and a video timer allows for the reduction of the latency to a minimum.

Some embodiments may include a video processing pipeline that is highly optimized for mixed reality applications. For example, the video processing pipeline may optimize for latency while synchronizing two independent video streams. The pipeline may operate with minimal frame buffering even while performing complex operations such as Bayer decoding, lens and display distortion correction, foreground separation (e.g., chroma key video substitution), and chromatic aberration correction. Embodiments may be implemented using any suitable processors, such as field programmable gate arrays (FPGAs), which may be integrated into higher-level systems. In some embodiments, the video processing pipeline achieves a processing latency of under 100 microseconds (μs) for the virtual scene, pixel in-to-pixel out, and under 1 ms for the real scene, pixel in-to-pixel out; the remainder of the latency in the mixed reality system may be from camera exposure time and transport/display latency of a mixed reality image on display. As such, embodiments may be configured to meet or exceed the 20 ms end-to-end camera latency objective, which results in a latency of the camera system that is imperceptible to the user.

Embodiments are configured to support high frame rates (e.g., 90 frames per second (FPS) and higher) and high-resolution video (e.g., 2160×1200 virtual video and higher; e.g., 2688×1440 camera video and higher). Embodiments are scalable to support even higher resolution video and higher frame rates in the future. Embodiments may perform high quality mixed reality blending in real time. Additionally, embodiments may be configured to accommodate any suitable foreground separation processes, such as chroma key-based "green screen" foreground separation processes or infrared depth sensor foreground separation processes.

Referring now to FIG. 1, an exemplary embodiment of a system according to the inventive concepts disclosed herein includes at least one head wearable device 102 and at least one computing device 122, some or all of which may be communicatively coupled at any given time. For example, the head wearable device 102 may be configured to receive virtual images (e.g., virtual scene images) from the computing device 122 and configured to provide a wearer of the head wearable device 102 with a mixed reality experience by blending the virtual images with real images (e.g., real scene images) to create combined three-dimensional immersive scene images, which are presented to the wearer of the head wearable device 102.

The head wearable device 102 may be configured to present mixed reality scene images to the wearer of the head wearable device 102. The head wearable device 102 may include at least one camera (e.g., camera 104-1 and camera 104-2), at least one buffer (e.g., buffers 106-1, 106-2, 106-3, and 106-4), at least one processor 108, at least one memory 110, at least one storage device 112, a head tracking system 114, an eye tracking system 116, at least one display (e.g., display 118-1 and display 118-2), and at least one speaker 120, some or all of which may be communicatively coupled.

The cameras 104-1, 104-2 may be configured to capture real images (e.g., real scene images) of a wearing user's field of view. The cameras 104-1, 104-2 may be implemented stereoscopically such that a first camera 104-1 (e.g., a left camera) aligns with a wearing user's left eye field of view and a second camera 104-2 (e.g., a right camera) aligns with the wearing user's right eye field of view. The cameras 104-1, 104-2 may be configured to output the real images as real image data (e.g., real scene image data) to the processor 108 and/or the buffers 106-1, 106-2. For example, each of the cameras 104-1, 104-2 may be configured to output a stream of real images as a stream of real image data to one of the buffers 106-1, 106-2. While the head wearable device 102 exemplarily includes two cameras 104-1, 104-2 as shown, in some embodiments, the head wearable device 102 may include any suitable number of cameras.

The buffers 106-1, 106-2, 106-3, and 106-4 may be configured to receive and temporarily store at least a portion of the real images from the cameras 104-1, 104-2 as real image data and to receive and temporarily store at least a portion of virtual images from the processor 124 as virtual image data. Each of the buffers 106-1, 106-2, 106-3, and 106-4 may be implemented as partial frame buffers. The buffers 106-1, 106-2, 106-3, and 106-4 may be configured to ensure pixel data is always available for the processor 108 to prevent the processor 108 from starving for data to process. In some embodiments, each of the buffers 106-1, 106-2, 106-3, and 106-4 may be small (e.g., configured to temporarily store a few lines (e.g., rows or columns) of pixel data at a given time). In some embodiments, the buffers 106-1, 106-2, 106-3, and 106-4 utilize DMA and are configured as partial frame buffers. For example, the processor 108 may include a DMA controller with multi-port access to the buffers 106-1, 106-2, 106-3, and 106-4. As soon as a few lines of the image have been written to the buffer (the "head"), the processor 108 may be configured to immediately start reading the image back out of the buffer for processing (the "tail"). The "head" may continue to lead the "tail" by only a few lines of image, which is enough to ensure that the downstream processing sees an uninterrupted stream of pixels. As compared to a traditional camera system, which uses a dual- or triple-round-robin buffering scheme, the partial frame buffering of some embodiments only requires a fraction of a frame in both processing time and buffering time.

For example, each of the buffers 106-1, 106-2 may be configured to receive real images from one of the cameras 104-1, 104-2 as real image data and to temporarily store at least a portion (e.g., at least one line) of the real image data before outputting the stored portion of the real image data to the processor 108. For example, the buffer 106-1 may be configured to receive and store a first portion (e.g., at least one line) of a real image frame from the camera 104-1; and the buffer 106-1 may be configured to receive and store a second portion (e.g., at least one line) of the real image frame from the camera 104-1 while providing (e.g., concurrently providing) the first portion of the real image frame to the processor 108. Similarly, for example, the buffer 106-2 may be configured to receive and store a first portion (e.g., at least one line) of a real image frame from the camera 104-2; and the buffer 106-2 may be configured to receive and store a second portion (e.g., at least one line) of the real image frame from the camera 104-2 while providing (e.g., concurrently providing) the first portion of the real image frame to the processor 108. Similarly, for example, the buffer 106-3 may be configured to receive and store a first portion (e.g., at least one line) of a left virtual image frame from the processor 124; and the buffer 106-3 may be configured to receive and store a second portion (e.g., at least one line) of the left virtual image frame from the processor 124 while providing (e.g., concurrently providing) the first portion of the left virtual image frame to the processor 108. Similarly, for example, the buffer 106-4 may be configured to receive and store a first portion (e.g., at least one line) of a right virtual image frame from the processor 124; and the buffer 106-4 may be configured to receive and store a second portion (e.g., at least one line) of the right virtual image frame from the processor 124 while providing (e.g., concurrently providing) the first portion of the right virtual image frame to the processor 108.

While the buffers 106-1, 106-2, 106-3, and 106-4 are exemplarily depicted as being separate from the processor 108, in some embodiments, the processor 108 includes one or more of the buffers 106-1, 106-2, 106-3, and 106-4. Additionally, while four of the buffers 106-1, 106-2, 106-3, and 106-4 are exemplarily shown, some embodiments may include any suitable number of buffers or may omit one or more of the buffers 106-1, 106-2, 106-3, and 106-4.

The processor 108 may be implemented as any suitable processor, such as a general purpose processor, an image processor, and/or an FPGA. The processor 108 may be configured to receive streams of the real images (e.g., a stream of left real images and a stream of right real images) as real image data from the cameras 104-1, 104-2 and/or the buffers 106-1, 106-2. The processor 108 may be configured to perform some or all of the processing operations of the image processing pipeline depicted and described with respect to FIG. 4. Also, for each left real image, the processor 108 may be configured to receive a left virtual image from the computing device 122 and/or the buffer 106-3. Similarly, for each right real image, the processor 108 may be configured to receive a right virtual image from the computing device 122 and/or the buffer 106-4. For each real image and each corresponding virtual image, based at least on a pixel mask, the processor 108 may be configured to blend the real image and the virtual image to create a mixed reality image. The processor 108 may be configured to output left and right streams of mixed reality images as mixed reality image data to the displays 118-1, 118-2 for presentation to a wearing user of the head wearable device 102.

In some embodiments, the at least one processor 108 may be implemented as a plurality of processors, such as at least one general purpose processor, at least one FPGA, and/or at least one image processor. The processor 108 may be configured to run various software applications or computer code stored in a non-transitory computer-readable medium and configured to execute various instructions or operations. The processor 108 may be implemented as a special purpose processor configured to execute instructions for performing any or all of the operations disclosed throughout.

Each of the displays 118-1, 118-2 may be configured to receive a stream of mixed reality images as a stream of mixed reality image data and present the stream of mixed reality images to a wearing user of the head wearable device 102. For example, the display 118-1 may be a left display configured to present images to a left eye of a wearing user. Similarly, for example, the display 118-2 may be a right display configured to present images to a right eye of the wearing user. The displays 118-2 may be implemented as any suitable display, such as an occluded display (e.g., Oculus Rift). Additionally, while the displays 118-1, 118-2 are exemplarily depicted as two displays, the displays 118-1, 118-2 may be implemented as any suitable number of displays.

The speaker 120 may be configured to receive audio content associated with a mixed reality environment and to present the audio content as audio to a wearing user of the head wearable device 102. Additionally, while the speaker 120 is depicted as a single speaker, the speaker 120 may be implemented as a plurality of speakers, such as one speaker for each ear of a user.

While the cameras 104-1, 104-2, the buffers 106-1, 106-2, 106-3, 106-4, the processor 108, the memory 110, the storage device 112, the head tracking system 114, the eye tracking system 116, the displays 118-1, 118-2, and the speaker 120 of the head wearable device 102 have been exemplarily depicted as being implemented as separate devices or subsystems, in some embodiments, some or all of the cameras 104-1, 104-2, the buffers 106-1, 106-2, 106-3, 106-4, the processor 108, the memory 110, the storage device 112, the head tracking system 114, the eye tracking system 116, the displays 118-1, 118-2, and/or the speaker 120 may be implemented as a single integrated system or device or as any number of integrated and/or partially integrated subsystems and/or devices.

While the head wearable device 102 exemplarily includes elements as shown, in some embodiments, one or more of the elements of the head wearable device 102 may be omitted, or the head wearable device 102 may include other elements.

The computing device 122 may include at least one processor 124, at least one memory 126, and at least one storage device 128, as well as other components, equipment, and/or devices commonly included in a computing device, some or all of which may be communicatively coupled. The processor 124 may be implemented as any suitable processor, such as a general purpose processor, an FPGA, and/or an image processor. For example, the computing device 122 may be configured to receive position and orientation data (e.g., a stream of position and orientation data) from the head wearable device 102, wherein the position and orientation data is indicative of a position and orientation of the user's head. For example, the computing device 122 may be configured to receive position and orientation data from the head tracking system 114 of the head wearable device 102. Based at least on the position and orientation data, the processor 124 may be configured to generate a left virtual image (e.g., a left virtual scene image) corresponding to a field of view of the left eye of the wearer of the head wearable device 102. Similarly, based at least on the position and orientation data, the processor 124 may be configured to generate a right virtual image (e.g., a right virtual scene image) corresponding to a field of view of the right eye of the wearer of the head wearable device 102. The processor may be configured to output the virtual images as virtual image data to the head wearable device 102. The processor 124 may be configured to generate streams of left and right virtual images and output the streams of left and right virtual images as streams of virtual image data to the head wearable device 102. The processor 124 may be configured to run various software applications or computer code stored (e.g., maintained) in a non-transitory computer-readable medium and configured to execute various instructions or operations. Additionally, for example, the computing device 122 or the processor 124 may be implemented as special purpose computers or special purpose processors configured (e.g., programmed) to execute instructions for performing any or all of the operations disclosed throughout. In some embodiments, the system of FIG. 1 may include any suitable number of computing devices 122, such as a plurality.

While the computing device 122 exemplarily includes elements as shown, in some embodiments, one or more of the elements of the computing device 122 may be omitted, or the computing device 122 may include other elements.

While the head wearable device 102 and the computing device 122 have been exemplarily depicted as being implemented as separate devices or systems, in some embodiments, some or all of the head wearable device 102 and the computing device 122 may be implemented as a single integrated system or device or as any number of integrated and/or partially integrated systems and/or devices.

While FIG. 1 exemplarily includes elements as shown, in some embodiments, one or more of the elements of the system may be omitted, or the system may include other elements. Additionally, while an embodiment has been depicted as including one head wearable device 102 and one computing device 122, other embodiments may include any number of head wearable devices 102 of various types and computing devices 122 of various types positioned or moving anywhere in the system.

Figure 2:
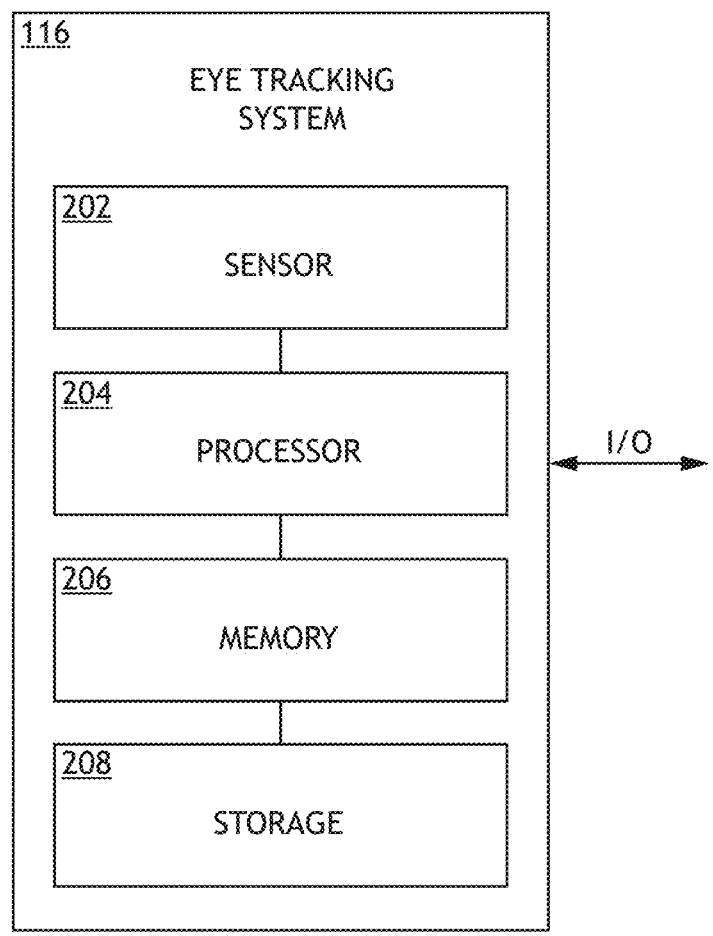
FIG. 2 is a view of the eye tracking system of the head wearable device of FIG. 1 according to the inventive concepts disclosed herein.

Referring now to FIG. 2, the eye tracking system 116 of the head wearable device 102 of FIG. 1 is shown. The eye tracking system 116 may be configured to track eye gestures, track movement of a user's eye, track a user's gaze, determine a location of a vergence point (sometimes referred to as a point of regard) of a user's gaze, determine eye locations, determine an intra-pupillary distance (IPD) between a user's eyes, determine a direction between a determined location of a user's eye and a determined location of a vergence point for each of a user's eyes, and/or otherwise receive inputs from a user's eyes. The eye tracking system 116 may be configured for performing fully automatic eye tracking operations of users in real time. The eye tracking system 116 may include at least one sensor 202, at least one processor 204, memory 206, and storage 208, as shown in FIG. 2, as well as other components, equipment, and/or devices commonly included in an eye tracking system. The sensor 202, the processor 204, the memory 206, and the storage 208, as well as the other components, equipment, and/or devices commonly included in an eye tracking system may be communicatively coupled.

The processor 204 of the eye tracking system 116 may be configured to process data received from the sensor 202 and output processed data to the processor 108 and/or the computing device 122. For example, the processor 204 may be configured to determine a location of a vergence point of a user's gaze, determine eye locations, determine an intra-pupillary distance (IPD) between a user's eyes, and/or determine a direction between a determined location of a user's eye and a determined location of a vergence point for each of a user's eyes. Additionally, for example, the processor 204 may be configured to generate data associated with such determined information and output the generated data to the processor 108 and/or the computing device 122. The processor 204 of the eye tracking system 116 may be configured to run various software applications or computer code stored in a non-transitory computer-readable medium and configured to execute various instructions or operations. The processor 204 may be implemented as a special purpose processor configured to execute instructions for performing any or all of the operations disclosed throughout.

Figure 3:
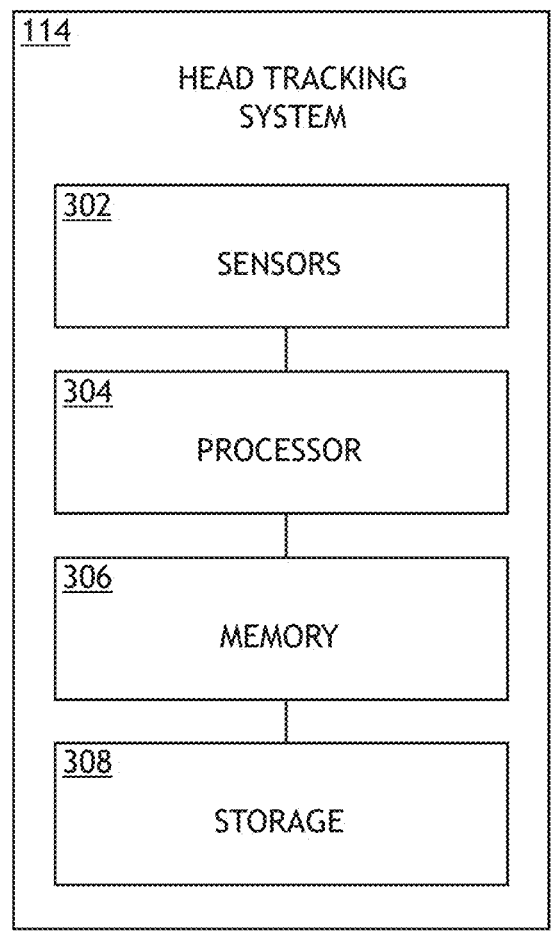
FIG. 3 is a view of the head tracking system of the head wearable device of FIG. 1 according to the inventive concepts disclosed herein.

Referring now to FIG. 3, the head tracking system 114 of the head wearable device 102 of FIG. 1 is shown. The head tracking system 114 may be configured to determine and track a position and an orientation of a user's head relative to an environment, such as a training environment. The head tracking system 114 may be configured for performing fully automatic head tracking operations in real time. The head tracking system 114 may include sensors 302, a processor 304, memory 306, and storage 308, as shown in FIG. 3, as well as other components, equipment, and/or devices commonly included in a head tracking system. The sensors 302, the processor 304, the memory 306, and the storage 308, as well as the other components, equipment, and/or devices commonly included in a head tracking system may be communicatively coupled.

The processor 304 of the head tracking system 114 may be configured to process data received from the sensors 302 and output processed data to the computing device 122 and/or the processor 108. For example, the processor 304 may be configured to determine and track a position and orientation of a user's head relative to a training environment. Additionally, for example, the processor 304 may be configured to generate position and orientation data associated with such determined information and output the generated position and orientation data to the computing device 122 and/or the processor 108. The processor 304 of the head tracking system 114 may be configured to run various software applications or computer code stored in a non-transitory computer-readable medium and configured to execute various instructions or operations. The processor 304 may be implemented as a special purpose processor configured to execute instructions for performing any or all of the operations disclosed throughout.

Figure 4:
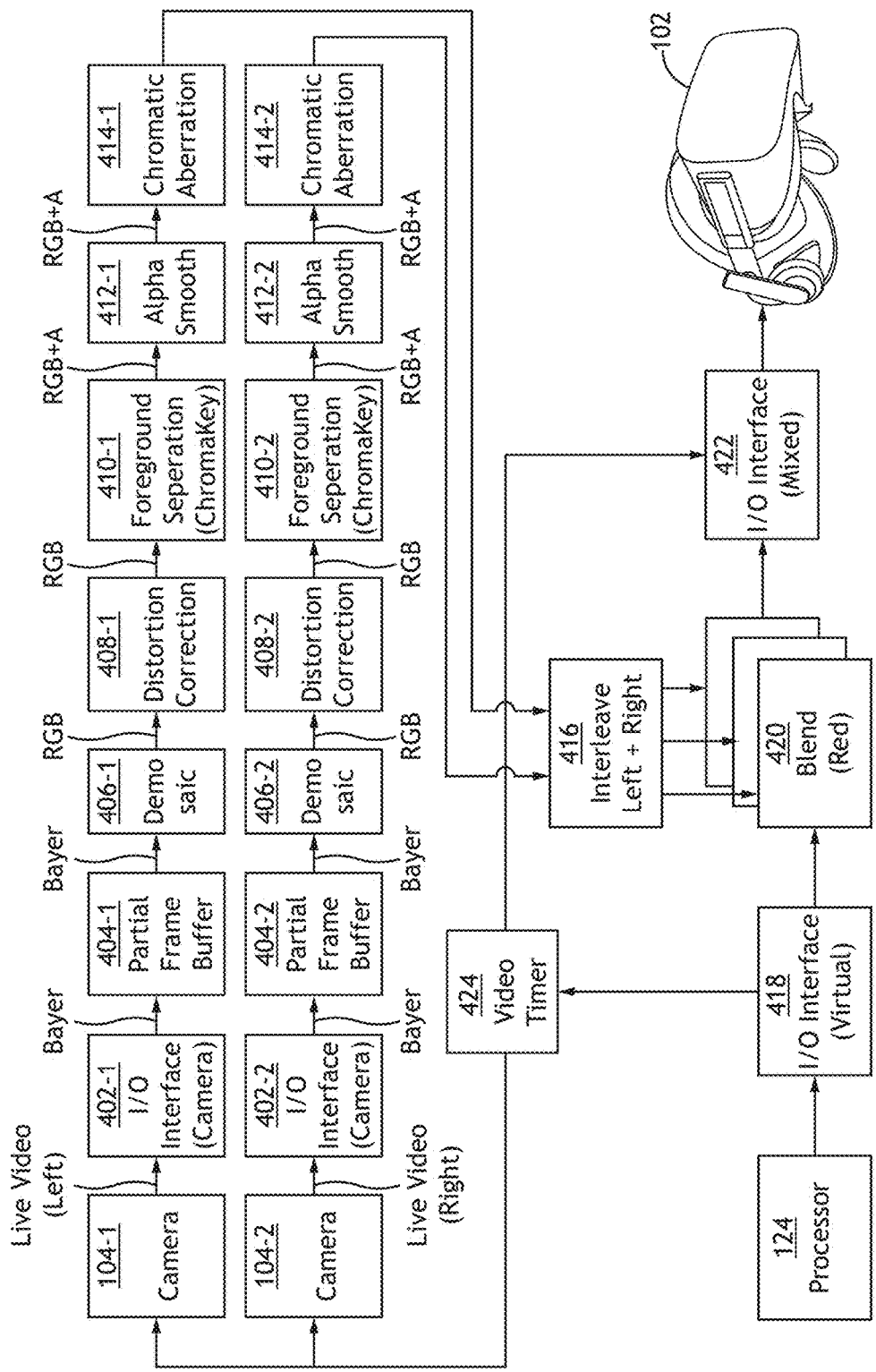
FIG. 4 is a view of an exemplary embodiment of an image processing pipeline according to the inventive concepts disclosed herein.

Referring now to FIG. 4, an exemplary embodiment of an image processing pipeline according to the inventive concepts disclosed herein is depicted. For example, the image processing pipeline may be implemented as or on the processor 108 and/or the buffers 106-1, 106-2, 106-3, and/or 106-4. The image processing pipeline may be configured to pre-process live real scene image data from the cameras 104-1, 104-2 and to prepare the live real scene image data for blending with virtual scene image data. The image processing pipeline may include left and right camera I/O interfacing 402-1, 402-2, left and right partial frame buffering 404-1, 404-2, left and right demosaic 406-1, 406-2, left and right distortion correction 408-1, 408-2, left and right foreground separation 410-1, 410-2, left and right alpha smoothing 412-1, 412-2, left and right chromatic aberration correction 414-1, 414-2, interleaving 416, virtual image I/O interfacing 418, blending 420, mixed image I/O interfacing 422, and a video timer 424.

The left and right camera I/O interfacing 402-1, 402-2 may include the transporting of left and right real scene images as left and right real scene image data from the left camera 104-1 and the right camera 104-2 to the buffers 106-1, 106-2, respectively. Frames of real scene video data are pushed from the cameras 104-1, 104-2 based on received "gen-locked" shutter triggers from the video timer 424.

The left and right partial frame buffering 404-1, 404-2 may include partially frame buffering left and right real scene images in the buffers 106-1, 106-2, respectively. For example, only a few lines of real scene image data may be written to each of the buffers 106-1, 106-2 before the processor 108 reads the lines of the real scene image data back from each of the buffers 106-1, 106-2.

In some embodiments, the image processing pipeline includes steps of left and right demosaic 406-1, 406-2. The steps of left and right demosaic 406-1, 406-2 may include the processor 108 removing Bayer encoding from each of the right and left real scene images which results in red-green-blue (RGB) real scene image data.

With respect to the left and right distortion correction 408-1, 408-2, the processor 108 may be configured to correct distortion caused by a lens of a respective camera 104-1, 104-2 and a respective display 118-1, 118-2. By applying the distortion correction, the processor 108 causes each real scene image to appear rectilinear when viewed, for example, in each display 118-1, 118-2 of the head wearable device 102. Additionally, by applying the distortion correction, each of the real scene images may blend naturally with respective virtual scene images, which may be generated by the processor 124 to account for the display distortion. Combining the lens distortion correction and the display distortion correction into a single distortion correction minimizes processing latency because distortion correction is the highest-latency process in the image processing pipeline. Because each of a lens distortion correction and a display distortion correction include a coordinate transformation, by combining the lens distortion correction and the display distortion correction, an intermediate transformation can be skipped. Thus, the combined distortion correction operation results in a single coordinate transform rather than two coordinate transforms. In some embodiments, distortion correction function uses a memory-optimized, streaming implementation. The streaming distortion correction operation may require only a fraction of the latency and buffer memory of a traditional distortion corrector. For example, the buffering required may be dictated by a worst-case vertical distortion in the transform, which may be a largest difference in input row coordinates required to generate any given single row of output. In an exemplary embodiment, the worst-case vertical may be about 25 rows of an image; however, in other embodiments, the worst-case scenario may be different.

With respect to the left and right foreground separation 410-1, 410-2, the processor 108 may be configured to generate a blending value, A, for each pixel of each of the left and right distortion corrected real scene images. The blending value, A, indicates foreground (real) versus background (virtual) pixel selection. Each of the steps of the left and right foreground separation 410-1, 410-2 generates per-pixel blending value, A, that is used in the virtual scene image and real scene image blending step 420, according to the formula: $B = A \cdot V + (1-A) \cdot R$, where B, V and R are the blended, virtual and real pixel values, respectively, and A is the blending ratio in the range [0.0, 1.0]. Foreground separation involves identifying which real objects in a user's field of view are to be included in a mixed reality scene and identifying which real objects are to be hidden by a virtual environment. Embodiments may utilize any suitable method of foreground separation, such as chroma keying or depth sensor foreground separation. For example, in embodiments that include chroma keying, the processor 108 may be configured to match the real scene image against a preselected "key color" value (e.g., a "green screen" color) and to calculate the blending value, A, corresponding to how closely the pixel matches the key color. Chroma key may perform the color matching in the hue, saturation, and value (HSV) color space rather than RGB, which allows for more heavily weighting the match based on color hue and less on intensity or brightness. Utilizing the HSV color space allows the chroma keying to perform consistently despite lighting variations (e.g. shadows) in the green screen environment.

With respect to the left and right blending value smoothing (e.g., Alpha smoothing) 412-1, 412-2, the processor 108 may be configured to perform a smoothing operation to reduce noise and improve the quality of the foreground separation. Chroma keying and depth sensing tend to be noisy processes. Some morphological operations may be performed to significantly reduce such noise and improve the visual quality of video blending. For example, chroma keying often results in thermal/spot noise in the cameras that produces false-positive (foreground objects identified as green screen) speckle noise. Such thermal/spot noise can be a major contributor to degradation of the mixed reality blending. In some embodiments, performing the smoothing operation may include performing a 2- or 3-pixel open operation (e.g., erosion followed by dilation) to reduce such speckle noise.

With respect to the left and right chromatic aberration correction 414-1, 414-2, the processor 108 may be configured to correct chromatic aberration distortion of left and right real scene images and the blending values. Performing the chromatic aberration correction addresses the prism effect of the display lenses on the image data stream. Chromatic Aberration refers to the fact that different wavelengths of light refract at different angles through a lens. As such, a given pixel should be rendered to the screen with the pixel's red, green and blue components slightly askew on the display to counteract this effect and to cause the right color to appear at the user's eye. To perform the chromatic aberration correction, a unique distortion pattern may be independently applied to each of the red, green, and blue channels. Additionally, because the blending value, A, calculated in the foreground separation 410-1, 410-2 steps applies to the combined RGB pixel, when the color channels are separated, the blending value follows each color channel separately so that each color plane can be independently blended, virtual-to-real. As such, the processor 108 performs the same chromatic aberration correction operation, which may include bilinear interpolation, on the blending value channel as the color values to ensure smooth anti-aliasing of real-virtual boundaries as color values undergo the distortion. As a result of performing each of the left and right chromatic aberration correction 414-1, 414-2, the processor 108 outputs a stream of three independent color planes, each with its own blending value channel for blending to the mixed reality scene. The left and right real scene image streams have been transformed to align with the geometry of the left and right virtual scene image and have been processed to separate the foreground to be overlaid on top of the virtual scene.

In some embodiments, with respect to the interleaving 416, the processor 108 may be configured to interleave the color planes of the left processed real scene image and the right processed real scene image.

The left and right virtual images via virtual image I/O interfacing 418 may include the processor 108 receiving left and right virtual scene images as left and right virtual scene image data from the processor 124.

With respect to the blending 420, the processor 108 may be configured to blend each of the left and right real scene images with a corresponding virtual scene image. The processor 108 may blend each color plane independently by using each color plane's associated blending value channel generated in the chromatic aberration correction steps 414-1, 414-2. As such, the processor may be configured to output left and right mixed reality scene images via a mixed image I/O interface 422 to the displays 118-1, 118-2 for presentation to a wearing user of the head wearable device 102.

The video timer 424 may be configured to synchronize the system. For example, the video timer 424 may be configured to trigger events for each frame just in time so that camera data can arrive as late as possible to minimize latency. The video timer 424 may be configured to ensure that the cameras 104-1, 104-2 and virtual scene image source remain "gen-locked" to minimize timing jitter and buffering requirements. For example, the video timer 424 may be configured to trigger the shutter of the cameras 104-1, 104-2 based on the timing of the generation of virtual scene images.

In some embodiments, by tuning of the foreground separation 410-1, 410-2 and blending value smoothing 412-1, 412-2 functions, the foreground separation 410-1, 410-2 and blending value smoothing 412-1, 412-2 functions can be implemented with simple 3×3 or 5×5 morphological operations, such as pixel-by-pixel color matching, erosion, and dilation, rather than more computationally costly operations, such as blob detection, flood fill, or segmentation, which typically require two or more passes through the entire image and which would result in at least one frame time of additional latency. Streaming of the foreground separation 410-1, 410-2 and blending value smoothing 412-1, 412-2 functions allows embodiments to achieve the low latency requirements of a mixed reality system.

Figure 5A:
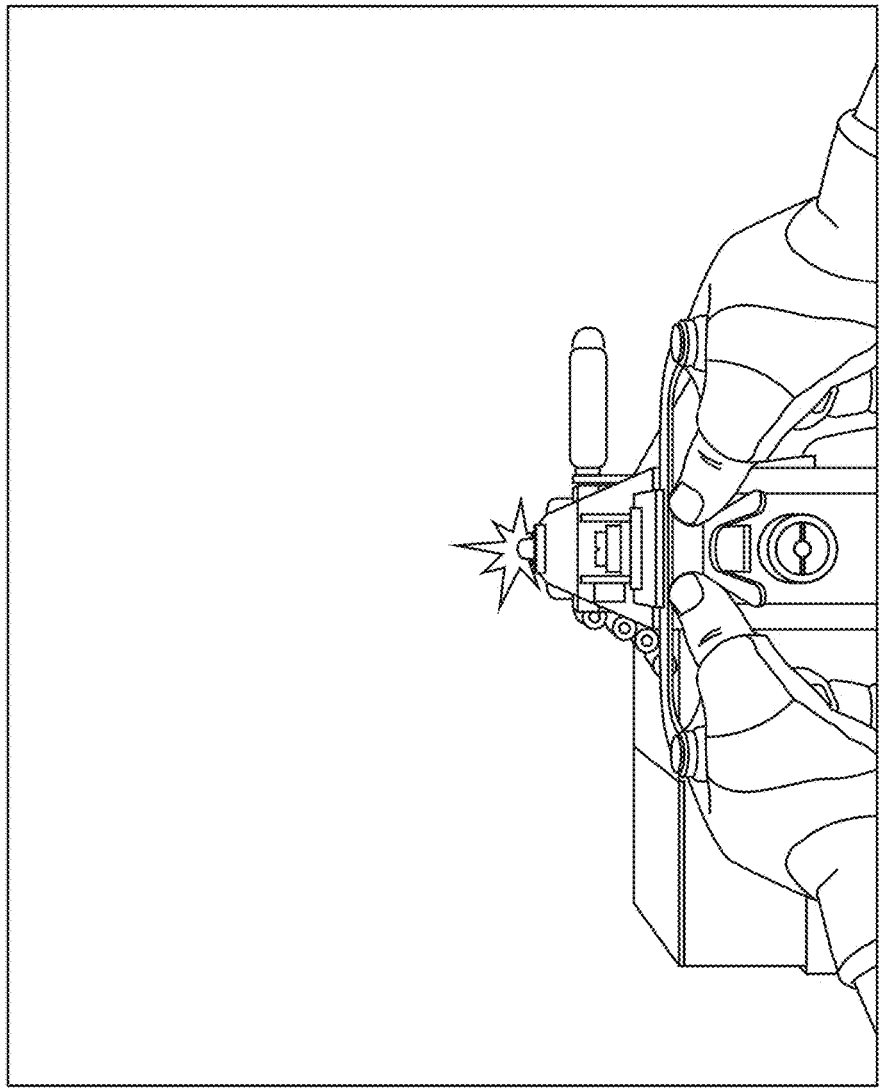
FIG. 5A shows an exemplary left real scene image of a user holding an object in front of a green screen captured by a left camera according to the inventive concepts disclosed herein.

Referring now to FIG. 5A, an exemplary left real scene image of a user holding a gun in front of a green screen captured by the left camera 104-1 according to the inventive concepts disclosed herein is depicted. The left real scene image may be partially buffered and provided to the processor 108. The processor 108 may be configured to perform various image processing operations on the left real scene image as disclosed throughout.

Figure 5B:
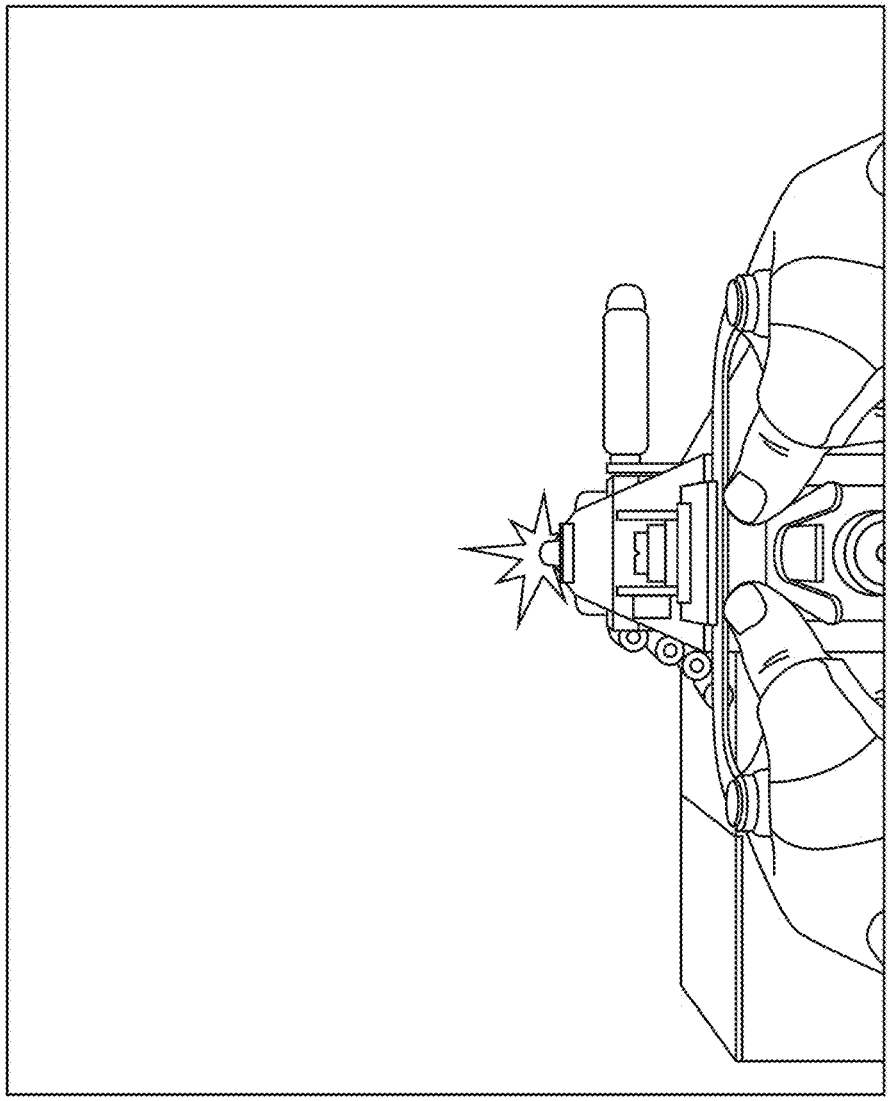
FIG. 5B shows an exemplary right real scene image of the user holding the object in front of the green screen captured by a right camera according to the inventive concepts disclosed herein.

Referring now to FIG. 5B, an exemplary right real scene image of the user holding the gun in front of the green screen captured by the right camera 104-2 according to the inventive concepts disclosed herein is depicted. The right real scene image may be partially buffered and provided to the processor 108. The processor 108 may be configured to perform various image processing operations on the right real scene image as disclosed throughout.

Referring now to FIG. 6A, an exemplary left virtual scene image generated by the processor 124 according to the inventive concepts disclosed herein is depicted. The processor 124 may be configured to generate the left virtual scene image corresponding to a field of view of the left eye of the wearer of the head wearable device 102. The processor 124 may be configured to output the left virtual scene image to the head wearable device 102.

Figure 6B:
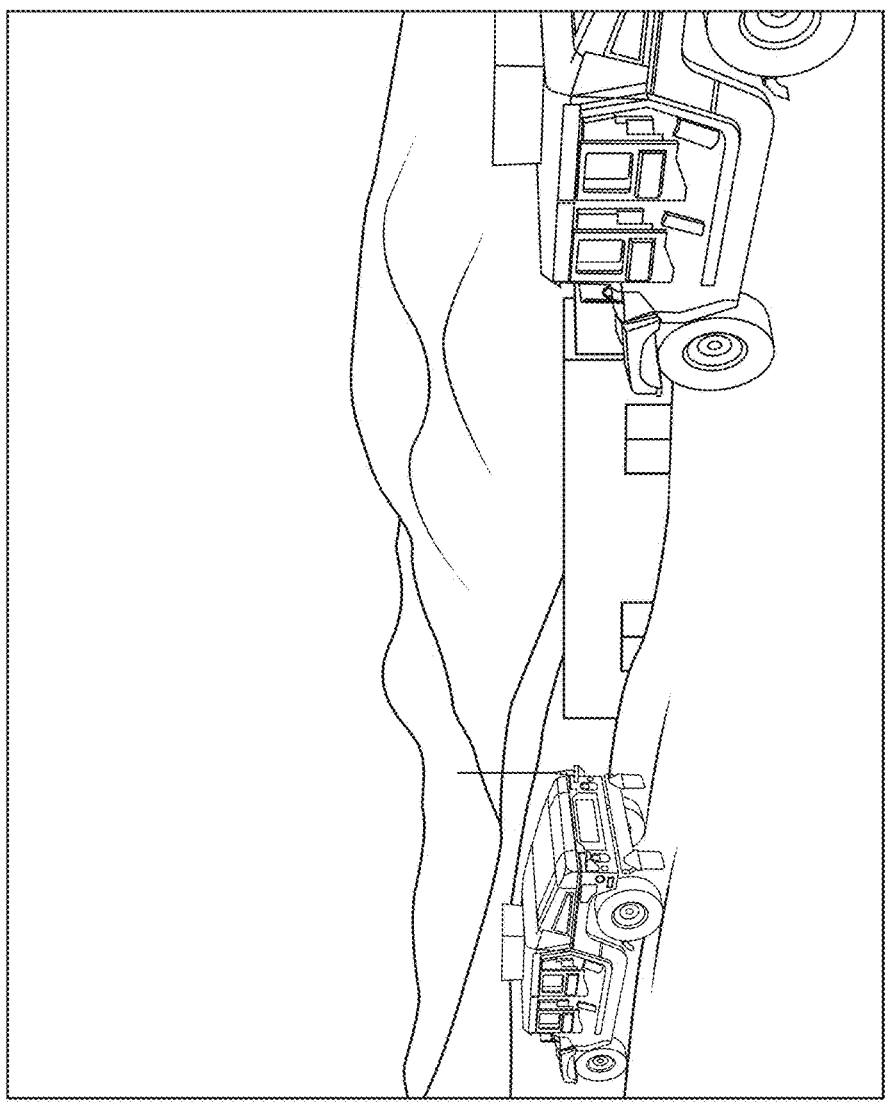
FIG. 6B shows an exemplary right virtual scene image according to the inventive concepts disclosed herein.

Referring now to FIG. 6B, an exemplary right virtual scene image generated by the processor 124 according to the inventive concepts disclosed herein is depicted. The processor 124 may be configured to generate the right virtual scene image corresponding to a field of view of the right eye of the wearer of the head wearable device 102. The processor 124 may be configured to output the right virtual scene image to the head wearable device 102.

Figure 7A:
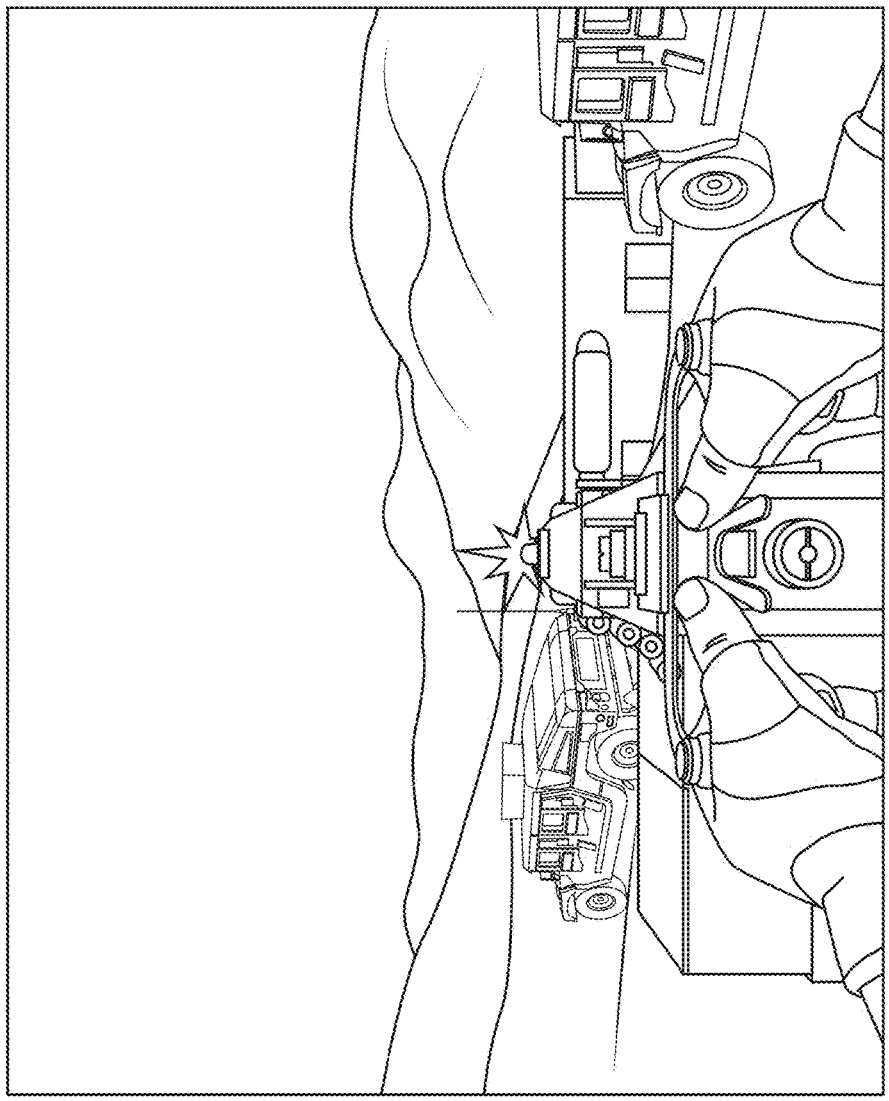
FIG. 7A shows an exemplary left mixed reality scene image according to the inventive concepts disclosed herein.

Referring now to FIG. 7A, an exemplary left mixed reality scene image generated by the processor 108 according to the inventive concepts disclosed herein is depicted. The processor 108 may be configured to receive the left virtual scene image from the processor 124. The processor 108 may be configured to blend a processed left real scene image and the left virtual scene image to generate the left mixed reality scene image. The processor 108 may be configured to output the left mixed reality scene image to the display 118-1 for presentation to the wearer of the head wearable device 102.

Figure 7B:
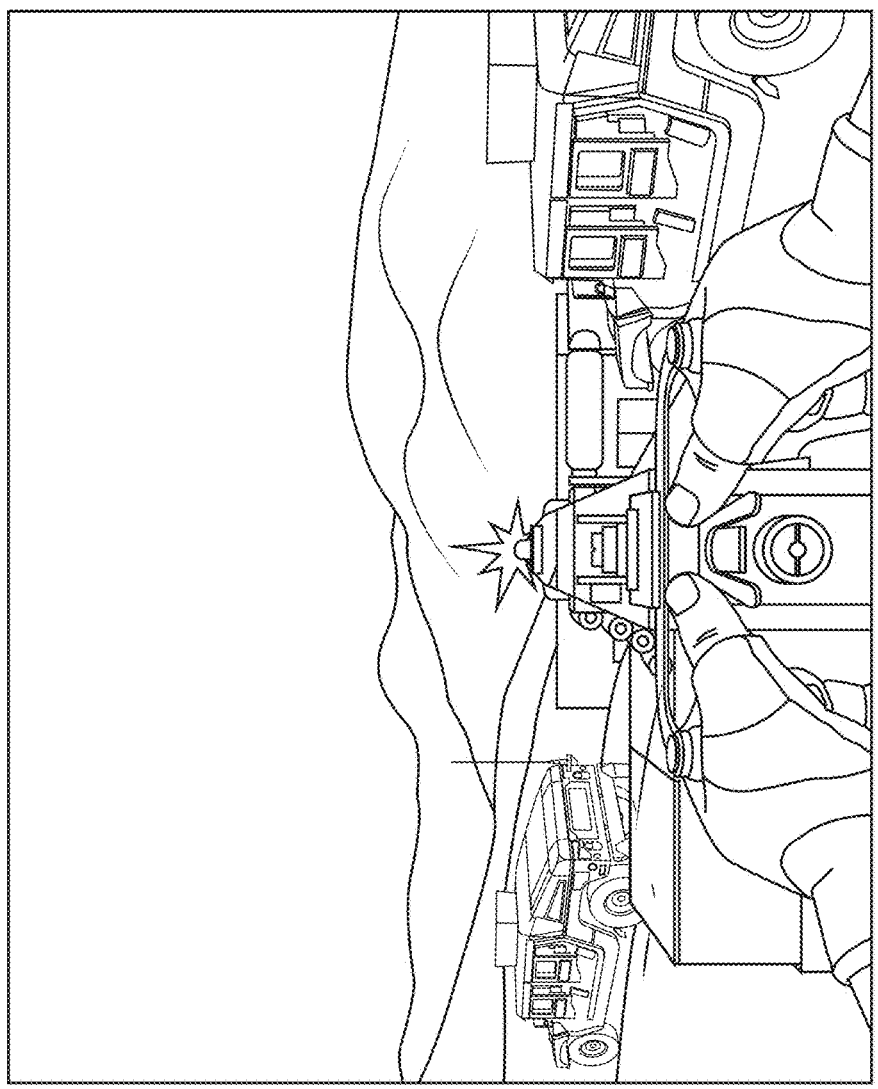
FIG. 7B shows an exemplary right mixed reality scene image according to the inventive concepts disclosed herein.

Referring now to FIG. 7B, an exemplary right mixed reality scene image generated by the processor 108 according to the inventive concepts disclosed herein is depicted. The processor 108 may be configured to receive the right virtual scene image from the processor 124. The processor 108 may be configured to blend a processed right real scene image and the right virtual scene image to generate the right mixed reality scene image. The processor 108 may be configured to output the right mixed reality scene image to the display 118-2 for presentation to the wearer of the head wearable device 102.

Figure 8:
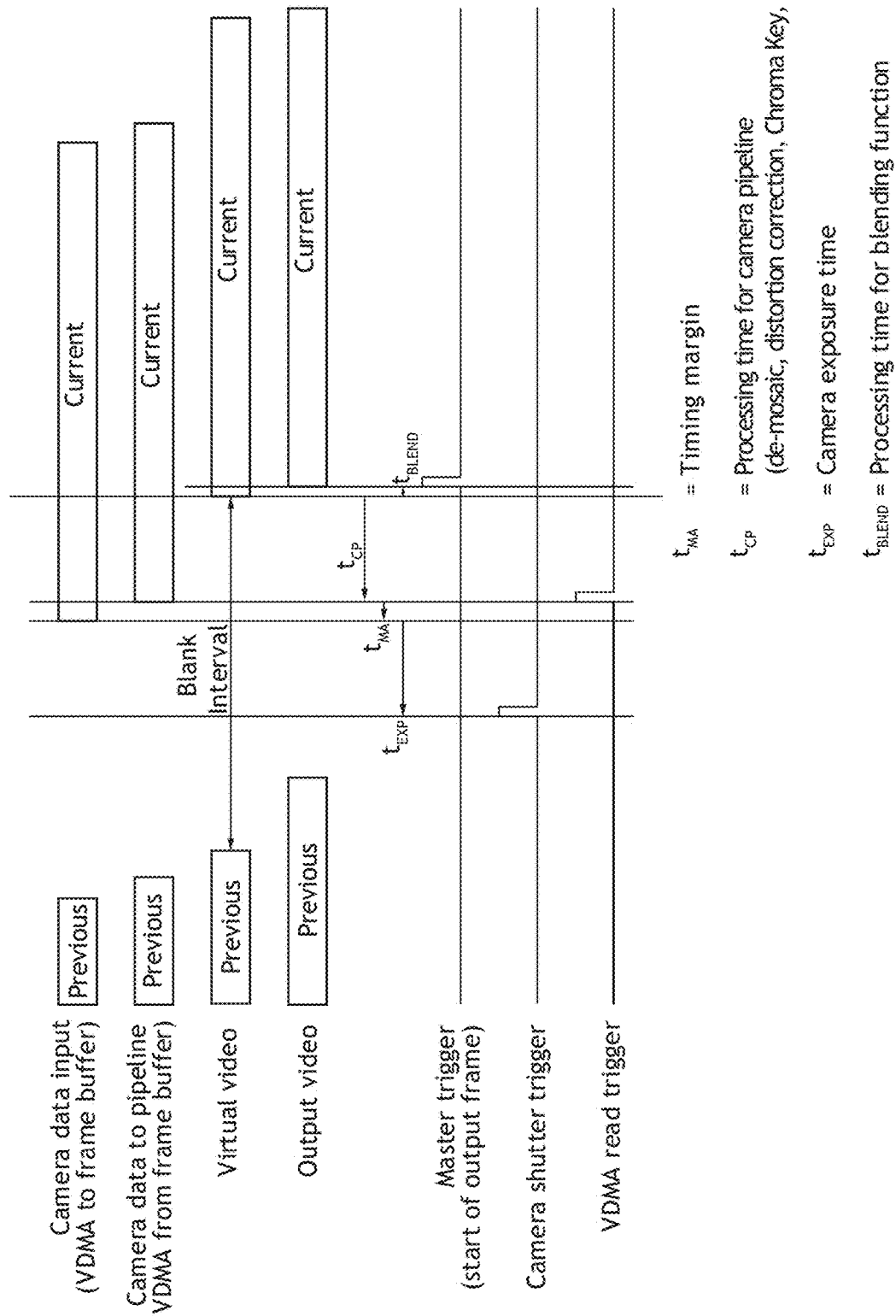
FIG. 8 shows an exemplary diagram of a video timing loop according to the inventive concepts disclosed herein.

Referring now to FIG. 8, an exemplary diagram of a video timing loop according to the inventive concepts disclosed herein is depicted. The video timing may be tuned to complete all operations just in time so that both the real and virtual video data is sitting idle as little as possible and so that cameras can be shuttered as late as possible in the cycle. This can minimize the end-to-end "photon-to-display pixel" latency of the system. Because the virtual scene images are generated at a fixed rate by the processor 124, video timer 424 may use the fixed rate of generating virtual scene images to synchronize the timing of the system. Once the video timer 424 locks on to the virtual video timing, the video timer 424 generates a just-in-time camera shutter trigger in anticipation of a next frame time. For example, the video timer 424 may calculate when the next expected virtual frame start will occur and may subtract the exposure time of the cameras plus the work-ahead time required by the distortion correction step (e.g., 408-1, 408-2) and other image processing pipeline functions to schedule the next shutter trigger. In some embodiments, only minimal buffering is needed for the virtual video stream, and because of the video timer 424, there will always be real scene pixel data ready and waiting just-in-time as virtual video data becomes available. As such, the virtual video stream operates as the pulse of the entire system. Embodiments are configured to achieve low system latency suitable for mixed reality applications.

Figure 9:
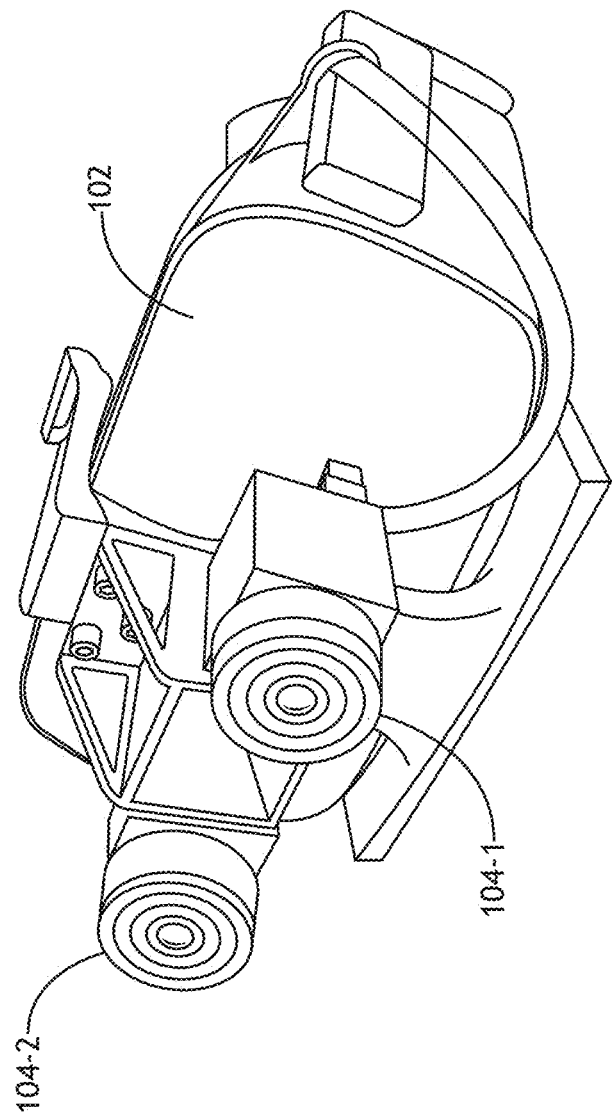
FIG. 9 shows a view of an exemplary embodiment of the head wearable device of FIG. 1 according to the inventive concepts disclosed herein.

Referring now to FIG. 9, an exemplary embodiment of the head wearable device 102 of FIG. 1 according to the inventive concepts disclosed herein is depicted.

In some embodiments, the cameras 104-1, 104-2 may be configured to utilize a rolling shutter instead of a global shutter. A rolling shutter may effectively eliminate the transport delay from the latency calculation, which can reduce the latency by several milliseconds. With respect to a global shutter, all pixels in the sensor integrate simultaneously and hence become available for consumption simultaneously. Since the pixels are transmitted sequentially, the last pixels in the sensor sit idle for most of a frame time before being received by the processor 108. With respect to a rolling shutter, the exposure time remains the same, but it is staggered as each row starts (and ends) integration slightly later than the previous row. Each row can be output immediately after exposure is finished, and processing can continue. As such, the transport delay may be eliminated from the "photon-to-display-pixel" latency calculation. One possible disadvantage of using a rolling shutter is that tearing is possible. For example, if there is significant motion in the scene, the resulting image could be distorted due to the camera capturing the moving scene at slightly different times per line. Tearing is typically only noticeable with fast motion relative to the frame time (e.g., 11 ms at Oculus Rift rates). To reduce tearing when using a rolling shutter, some embodiments may include utilizing the head tracking system 114 for motion tracking to at least partially compensate for the tearing effect. For example, by using the position and orientation data from the head tracking system 114, the processor 108 may calculate the effect of motion of the user's head and adjust the distortion correction function on a per-row basis to compensate for the tearing. Such compensation may result in a more stable image similar to a global shutter. Because user head movement is likely to be the primary source of motion and tearing in a mixed reality application, utilizing the head tracking system 114 for motion tracking may significantly compensate for the tearing effect.

Some embodiments may utilize asynchronous reprojection to reduce perceived latency. Asynchronous reprojection may include utilizing the head tracking system 114 for motion tracking to at least partially compensate for perceived latency. For example, by using the position and orientation data from the head tracking system 114, the processor 108 may compensate for latency in the real video processing by predicting the user's head position a few milliseconds in advance of the time the scene is displayed by the displays 118-1, 118-2. With respect to asynchronous reprojection, the cameras 104-1, 104-2 may be configured to capture a wider field of view than the scene displayed by the displays 118-1, 118-2. For example, the cameras 118-1, 118-2 may be configured to capture 5-10% of extra pixels on each edge of the displayed scene. When the processor 108 detects that the user's head is turning left, the processor 108 may modify the distortion correction function to pan an additional amount to the left so as to draw in extra pixels (e.g., the extra 5-10% of pixels) on the left edge, based on where the user's head is predicted to be by the time the scene is actually generated.

Figure 10:
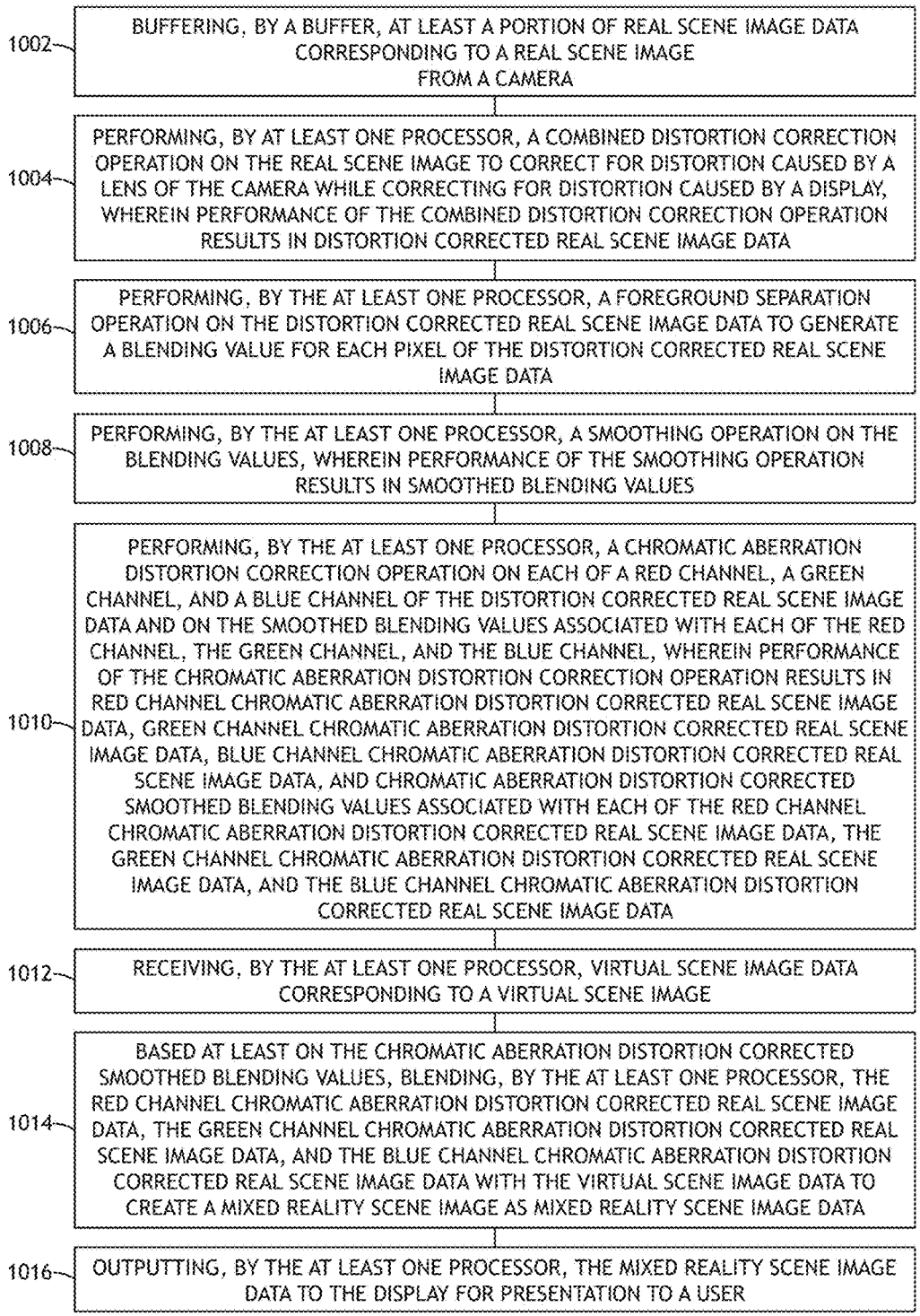
FIG. 10 is a diagram of an exemplary embodiment of a method according to the inventive concepts disclosed herein.

Referring now to FIG. 10, an exemplary embodiment of a method 1000 according to the inventive concepts disclosed herein may include one or more of the following steps. Additionally, for example, some embodiments may include performing one more instances of the method 1000 iteratively, concurrently, and/or sequentially. Additionally, for example, at least some of the steps of the method may be performed in parallel and/or concurrently. For example, left and right instances of the method 1000 may be performed concurrently and may be repeated for successive frames.

A step 1002 may include buffering, by a buffer, at least a portion of real scene image data corresponding to a real scene image from a camera.

A step 1004 may include performing, by at least one processor, a combined distortion correction operation on the real scene image to correct for distortion caused by a lens of the camera while correcting for distortion caused by a display, wherein performance of the combined distortion correction operation results in distortion corrected real scene image data.

A step 1006 may include performing, by the at least one processor, a foreground separation operation on the distortion corrected real scene image data to generate a blending value for each pixel of the distortion corrected real scene image data.

A step 1008 may include performing, by the at least one processor, a smoothing operation on the blending values, wherein performance of the smoothing operation results in smoothed blending values. For example, performance of the smoothing operation results in less noise and cleaner edges when blending the real-world objects to the virtual scene.

A step 1010 may include performing, by the at least one processor, a chromatic aberration distortion correction operation on each of a red channel, a green channel, and a blue channel of the distortion corrected real scene image data and on the smoothed blending values associated with each of the red channel, the green channel, and the blue channel, wherein performance of the chromatic aberration distortion correction operation results in red channel chromatic aberration distortion corrected real scene image data, green channel chromatic aberration distortion corrected real scene image data, blue channel chromatic aberration distortion corrected real scene image data, and chromatic aberration distortion corrected smoothed blending values associated with each of the red channel chromatic aberration distortion corrected real scene image data, the green channel chromatic aberration distortion corrected real scene image data, and the blue channel chromatic aberration distortion corrected real scene image data. The red, green and blue channels of the video may be distorted independently to correct for the chromatic aberration of the display lens. The blending values may be distorted in the same way, independently per color channel, so that the foreground/background-blended pixels of the three color channels align when viewed through the lens back at the user's eye.

A step 1012 may include receiving, by the at least one processor, virtual scene image data corresponding to a virtual scene image.

A step 1014 may include, based at least on the chromatic aberration distortion corrected smoothed blending values, blending, by the at least one processor, the red channel chromatic aberration distortion corrected real scene image data, the green channel chromatic aberration distortion corrected real scene image data, and the blue channel chromatic aberration distortion corrected real scene image data with the virtual scene image data to create a mixed reality scene image as mixed reality scene image data.

A step 1016 may include outputting, by the at least one processor, the mixed reality scene image data to the display for presentation to a user.

Further, the method 1000 may include any of the operations disclosed throughout.

As will be appreciated from the above, embodiments of the inventive concepts disclosed herein may be directed to a method, a system, and at least one head wearable device configured to reduce the latency of mixed reality processing.

As used throughout and as would be appreciated by those skilled in the art, "at least one non-transitory computer-readable medium" may refer to as at least one non-transitory computer-readable medium (e.g., memory 110, memory 126, memory 206, memory 306, buffer 106-1, buffer 106-2, buffer 106-3, buffer 106-4, storage 112, storage 128, storage 208, storage 308, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head wearable device, comprising:
a display;
a camera configured to capture a real scene image;
a buffer communicatively coupled to the camera, the buffer configured to buffer at least a portion of real scene image data corresponding to the real scene image from the camera; and
at least one processor communicatively coupled to the buffer, the at least one processor configured to:
utilize position and orientation data to compensate for tearing, the position and orientation data indicative of a position and an orientation of a head of a user relative to an environment, the position and orientation data obtained from a head tracking system;
perform a combined distortion correction operation on the real scene image to correct for distortion caused by a lens of the camera while correcting for distortion caused by the display, wherein performance of the combined distortion correction operation results in distortion corrected real scene image data;
perform a foreground separation operation on the distortion corrected real scene image data to generate a blending value for each pixel of the distortion corrected real scene image data;
perform a smoothing operation on the blending values, wherein performance of the smoothing operation results in smoothed blending values;
perform a chromatic aberration distortion correction operation on each of a red channel, a green channel, and a blue channel of the distortion corrected real scene image data and on the smoothed blending values associated with each of the red channel, the green channel, and the blue channel, wherein performance of the chromatic aberration distortion correction operation results in red channel processed real scene image data, green channel processed real scene image data, blue channel processed real scene image data, and processed blending values associated with each of the red channel processed real scene image data, the green channel processed real scene image data, and the blue channel processed real scene image data;
receive virtual scene image data corresponding to a virtual scene image;
based at least on the processed blending values, blend the red channel processed real scene image data, the green channel processed real scene image data, and the blue channel processed real scene image data with the virtual scene image data to create a mixed reality scene image as mixed reality scene image data; and
output the mixed reality scene image data to the display for presentation to the user.

2. The head wearable device of claim 1, wherein the display is a left display configured to present a left mixed reality scene image to a left eye of the user, wherein the camera is a left camera configured to capture a left real scene image along a field of view of the left eye of the user, wherein the head wearable device further comprises a right display configured to present a right mixed reality scene image to a right eye of the user and a right camera configured to capture a right real scene image along a field of view of the right eye of the user.

3. The head wearable device of claim 1, wherein the at least one processor is further configured to remove Bayer encoding from the real scene image prior to performance of the combined distortion correction operation.

4. The head wearable device of claim 1, further comprising a video timer configured to synchronize a shutter of the camera based on a timing of a generation of the virtual scene image.

5. The head wearable device of claim 1, wherein the buffer is a partial frame buffer configured to buffer less than a full frame of the real scene image data corresponding to the real scene image from the camera.

6. The head wearable device of claim 5, wherein the partial frame buffer is implemented with direct memory access.

7. The head wearable device of claim 1, wherein the camera is implemented with a global shutter.

8. The head wearable device of claim 1, wherein the camera is implemented with a rolling shutter.

9. A method, comprising:
buffering, by a buffer, at least a portion of real scene image data corresponding to a real scene image from a camera;
tracking, by a head tracking system, a position and orientation of a head of a user relative to an environment;
generating, by a processor of the head tracking system, position and orientation data indicative of the position and the orientation of the head of the user relative to the environment;
utilizing, by the at least one processor, the position and orientation data to compensate for tearing;
performing, by at least one processor, a combined distortion correction operation on the real scene image to correct for distortion caused by a lens of the camera while correcting for distortion caused by a display, wherein performance of the combined distortion correction operation results in distortion corrected real scene image data;
performing, by the at least one processor, a foreground separation operation on the distortion corrected real scene image data to generate a blending value for each pixel of the distortion corrected real scene image data;
performing, by the at least one processor, a smoothing operation on the blending values, wherein performance of the smoothing operation results in smoothed blending values;
performing, by the at least one processor, a chromatic aberration distortion correction operation on each of a red channel, a green channel, and a blue channel of the distortion corrected real scene image data and on the smoothed blending values associated with each of the red channel, the green channel, and the blue channel, wherein performance of the chromatic aberration distortion correction operation results in red channel processed real scene image data, green channel processed real scene image data, blue channel processed real scene image data, and processed blending values associated with each of the red channel processed real scene image data, the green channel processed real scene image data, and the blue channel processed real scene image data;
receiving, by the at least one processor, virtual scene image data corresponding to a virtual scene image;
based at least on the processed blending values, blending, by the at least one processor, the red channel processed real scene image data, the green channel processed real scene image data, and the blue channel processed real scene image data with the virtual scene image data to create a mixed reality scene image as mixed reality scene image data; and
outputting, by the at least one processor, the mixed reality scene image data to the display for presentation to the user.

10. The method of claim 9, further comprising:
upon buffering at least the portion of the real scene image data corresponding to the real scene image from the camera, removing Bayer encoding from the real scene image.

11. The method of claim 9, further comprising:
synchronizing, by a video timer, a shutter of the camera based on a timing of a generation of the virtual scene image.

12. The method of claim 9, wherein buffering, by the buffer, at least the portion of the real scene image data corresponding to the real scene image from the camera is buffering, by the buffer, less than a full frame of the real scene image data corresponding to the real scene image from the camera.

13. The method of claim 9, wherein the at least one processor, the buffer, the display, and the camera are implemented in a head wearable device, wherein the camera is configured to align with a field of view of an eye of the user.

14. The method of claim 9, wherein the method has a latency of less than 1 millisecond.

15. The method of claim 9, wherein the foreground separation operation is a chroma keying foreground separation operation.

16. The method of claim 9, wherein the foreground separation operation is a depth sensor foreground separation operation.

17. The method of claim 9, wherein the camera is implemented with a rolling shutter.

18. The method of claim 9, further comprising:
utilizing, by the at least one processor, the position and orientation data to perform an asynchronous reprojection.

19. A system, comprising:
a display;
a camera configured to capture a real scene image;
a buffer communicatively coupled to the camera, the buffer configured to buffer at least a portion of real scene image data corresponding to the real scene image from the camera; and
at least one processor communicatively coupled to the buffer, the at least one processor configured to:
utilize position and orientation data to compensate for tearing, the position and orientation data indicative of a position and an orientation of a head of a user relative to an environment, the position and orientation data obtained from a head tracking system;
perform a combined distortion correction operation on the real scene image to correct for distortion caused by a lens of the camera while correcting for distortion caused by the display, wherein performance of the combined distortion correction operation results in distortion corrected real scene image data;
perform a foreground separation operation on the distortion corrected real scene image data to generate a blending value for each pixel of the distortion corrected real scene image data;

perform a smoothing operation on the blending values, wherein performance of the smoothing operation results in smoothed blending values;

perform a chromatic aberration distortion correction operation on each of a red channel, a green channel, and a blue channel of the distortion corrected real scene image data and on the smoothed blending values associated with each of the red channel, the green channel, and the blue channel, wherein performance of the chromatic aberration distortion correction operation results in red channel processed real scene image data, green channel processed real scene image data, blue channel processed real scene image data, and processed blending values associated with each of the red channel processed real scene image data, the green channel processed real scene image data, and the blue channel processed real scene image data;

receive virtual scene image data corresponding to a virtual scene image;

based at least on the processed blending values, blend the red channel processed real scene image data, the green channel processed real scene image data, and the blue channel processed real scene image data with the virtual scene image data to create a mixed reality scene image as mixed reality scene image data; and output the mixed reality scene image data to the display for presentation to the user.

* * * * *